United States Patent
Mesecher

(10) Patent No.: US 7,830,982 B2
(45) Date of Patent: Nov. 9, 2010

(54) COMMON ANTENNA ARRAY USING BASEBAND ADAPTIVE BEAMFORMING AND DIGITAL IF CONVERSION

(75) Inventor: David Keith Mesecher, Melville, NY (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1189 days.

(21) Appl. No.: 11/433,695

(22) Filed: May 12, 2006

(65) Prior Publication Data

US 2007/0263748 A1 Nov. 15, 2007

(51) Int. Cl.
H04L 27/00 (2006.01)
(52) U.S. Cl. .................. 375/299; 375/347; 375/327; 342/81; 342/150; 342/352; 342/354; 342/377; 455/3.02; 455/550.1; 455/553.1
(58) Field of Classification Search ............. 455/427, 455/98, 102, 3.02, 550.1, 553.1; 375/295, 375/260, 299, 324, 347; 342/81, 150, 352, 342/354, 377, 432, 436
See application file for complete search history.

(56) References Cited

U.S. PATENT DOCUMENTS

| | | | |
|---|---|---|---|
| 5,541,607 A | 7/1996 | Reinhardt | |
| 5,856,804 A * | 1/1999 | Turcotte et al. | 342/371 |
| 6,052,085 A * | 4/2000 | Hanson et al. | 342/373 |
| 6,087,986 A * | 7/2000 | Shoki et al. | 342/383 |
| 6,188,915 B1 * | 2/2001 | Martin et al. | 455/562.1 |
| 6,658,234 B1 | 12/2003 | Dogan et al. | |
| 6,784,838 B2 | 8/2004 | Howell | |
| 6,822,607 B2 | 11/2004 | Tanaka et al. | |
| 6,898,248 B1 * | 5/2005 | Elgamal et al. | 375/259 |
| 7,043,271 B1 * | 5/2006 | Seto et al. | 455/562.1 |
| 7,092,690 B2 * | 8/2006 | Zancewicz | 455/273 |
| 2002/0054621 A1 * | 5/2002 | Kyeong et al. | 375/147 |
| 2003/0095068 A1 | 5/2003 | Purdy et al. | |
| 2003/0157965 A1 * | 8/2003 | Marro et al. | 455/560 |
| 2004/0104844 A1 | 6/2004 | Rooyen et al. | |
| 2004/0113839 A1 | 6/2004 | Vaccaro et al. | |
| 2004/0140929 A1 | 7/2004 | Toda et al. | |
| 2004/0189520 A1 | 9/2004 | Song et al. | |
| 2006/0079290 A1 * | 4/2006 | Seto et al. | 455/562.1 |
| 2006/0171418 A1 * | 8/2006 | Casini et al. | 370/474 |
| 2006/0192710 A1 * | 8/2006 | Schieblich | 342/368 |
| 2007/0099571 A1 * | 5/2007 | Withers et al. | 455/67.11 |

FOREIGN PATENT DOCUMENTS

| | | |
|---|---|---|
| WO | WO 03/032522 A2 | 4/2003 |
| WO | WO 03/032522 A3 | 4/2003 |

\* cited by examiner

*Primary Examiner*—David C Payne
*Assistant Examiner*—Rahel Guarino
(74) *Attorney, Agent, or Firm*—Robert P. Lenart, Esq.; Pietragallo Gordon Alfano Bosick & Raspanti, LLP

(57) ABSTRACT

An apparatus comprises a plurality of antenna elements, a plurality of digital signal processing devices for supplying phase-and-amplitude-weighted digital baseband signals, a beamforming processor for processing the weighted digital baseband signals to adaptively form a plurality of beam patterns for the antenna elements, a plurality of digital modulators for converting the digital baseband signals into intermediate frequency digital signals, and a modulator for modulating in-phase and quadrature components of the intermediate frequency digital signals to produce composite radio frequency output signals for the antenna elements. Receiving apparatus, and methods of transmitting and receiving a plurality of signals on a plurality of antenna elements are also provided.

4 Claims, 12 Drawing Sheets

COMMON ANTENNA ARRAY USING BASEBAND ADAPTIVE BEAMFORMING AND DIGITAL IF CONVERSION

STATEMENT OF GOVERNMENT INTEREST

This invention was made under Contract No. N00019-00-G-0425. The United States Government has rights in this invention under the contract.

FIELD OF THE INVENTION

This invention relates to communications and radar systems, and more particularly to such systems that include an antenna array coupled to a plurality of radio frequency devices.

BACKGROUND OF THE INVENTION

Surveillance aircraft can include a variety of radio frequency devices that perform communication and surveillance functions. Each of these devices must be connected to an antenna to receive and/or transmit radio frequency signals. As a result, several different types of antennas are typically mounted on surveillance aircraft.

For network centric warfare, a pivotal capability will be reliable, fast, high-bandwidth, wireless communications. It would be desirable to combine multiple communication and surveillance functions of a plurality of radio frequency devices using a common antenna.

SUMMARY OF THE INVENTION

This invention provides an apparatus comprising a plurality of antenna elements, a plurality of digital signal processing devices for supplying phase-and-amplitude-weighted digital baseband signals, a beamforming processor for processing the weighted digital baseband signals to adaptively form a plurality of beam patterns for the antenna elements, a plurality of digital modulators for converting the digital baseband signals into intermediate frequency digital signals, and a modulator for modulating in-phase and quadrature components of the composite intermediate frequency digital signals to produce composite radio frequency output signals for the antenna elements.

In another aspect, the invention provides a method comprising the steps of: using a plurality of digital signal processing devices to produce a plurality of phase-and-amplitude-weighted digital baseband signals, processing the weighted digital baseband signals to adaptively form a plurality of beam patterns for a plurality of antenna elements, converting the digital baseband signals into intermediate frequency digital signals, and modulating in-phase and quadrature components of the intermediate frequency digital signals to produce radio frequency output signals for the antenna elements.

In still another aspect, the invention provides an apparatus comprising a plurality of antenna elements, a down converter for converting signals received on the antenna elements to intermediate frequency signals, a plurality of analog-to-digital converters for converting the intermediate frequency signals to digital signals, a plurality of digital down converters for converting the digital signals to baseband signals, a plurality of digital signal processing devices for phase-and-amplitude-weighting the digital baseband signals, and a plurality of detectors for extracting information from the phase-and-amplitude-weighted digital baseband signals.

In yet another aspect, the invention provides a method comprising the steps of: receiving a plurality of signals on a plurality of antenna elements, down converting the signals received on the antenna elements to intermediate frequency signals, converting the intermediate frequency signals to digital signals, converting the digital signals to baseband signals, phase-and-amplitude-weighting the digital baseband signals, and extracting information from the phase-and-amplitude-weighted digital baseband signals.

DETAILED DESCRIPTION OF THE INVENTION

This invention seeks to provide reliable, fast, high-bandwidth, wireless communications, utilizing advances in signal processing, as opposed to adding more radio hardware. The invention provides a common antenna array using baseband adaptive beamforming and digital intermediate frequency (IF) conversion.

Figure 1:
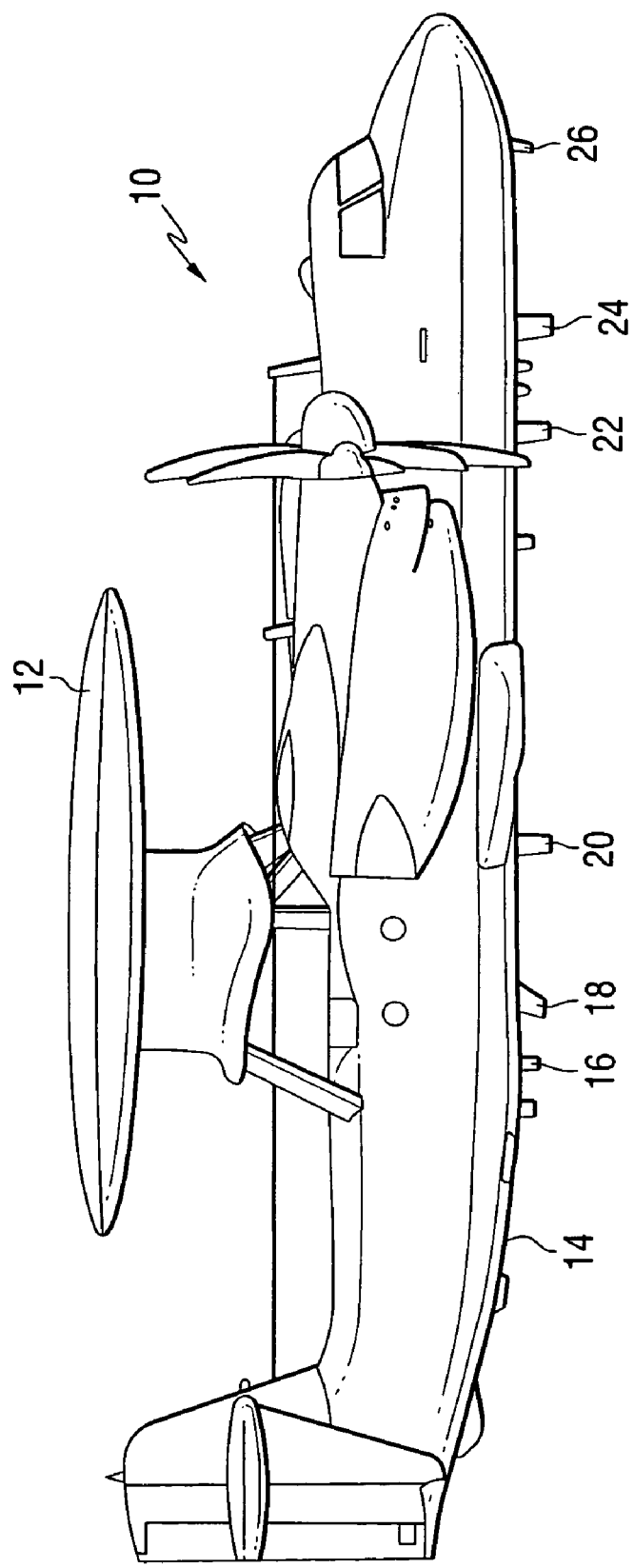
FIG. 1 is a pictorial representation of an aircraft including a plurality of communications devices that can use the present invention.

Referring to the drawings, FIG. 1 is a pictorial representation of an aircraft that can carry a plurality of radio frequency devices that can be used to implement the present invention. The aircraft 10 includes a rotodome 12 and a fuselage 14. A plurality of antennas, for example, blade antennas 16, 18, 20, 22, 24 and 26, and additional antennas in the rotodome, are used to transmit and receive radio frequency signals. Each of the antennas is connected to a radio frequency device. Such devices include for example, communications transmitters and receivers, radar, etc., mounted in the aircraft. In one example, there are many radios of the same type on the aircraft, and each radio has its own antenna.

An array of antenna elements mounted on a rotodome and the fuselage of a surveillance aircraft has been proposed to provide the required antenna functionality. The same collection of antenna elements could be used to service all radios, (or all virtual radios if software-defined-radio technology is used) by organizing the antenna elements into a shared array that could provide multiple-user adaptive beamforming to enhance the transmit and receive signal strength for each radio frequency device. This could be realized by allowing each radio to determine its own set of array element weights by using an adaptive algorithm, and then applying these weights in the digital baseband processor of each individual radio function, as opposed to applying them at the antenna elements, as do traditional phased array antennas.

Figure 2:
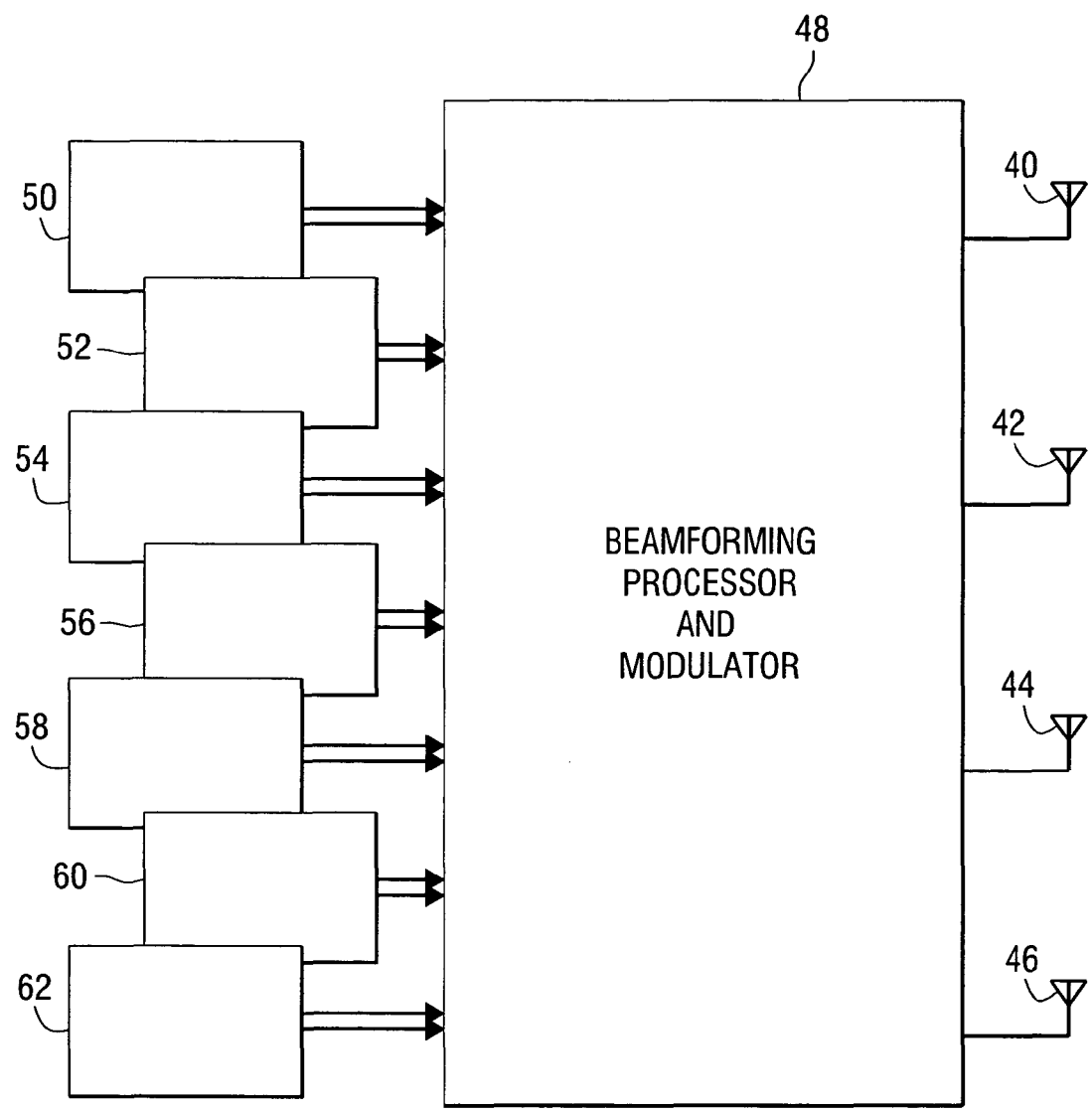
FIG. 2 is a schematic diagram of an apparatus constructed in accordance with the invention.

FIG. 2 is a schematic diagram of an apparatus constructed in accordance with the invention in which the transmit function of the invention is depicted. The apparatus includes a plurality of antenna elements 40, 42, 44, and 46 for receiving a plurality of radio frequency signals, with each of the radio frequency signals having an associated magnitude and phase. Each of the antenna elements is coupled to a beamforming processor and modulator 48. A plurality of radios (or other radio frequency devices) 50, 52, 54, 56, 58, 60 and 62 are also coupled to the beamforming processor and modulator 48. The radios can be, for example, ARC-210 radios that provide multimode voice and data communications over the 30-400 MHz frequency range in either normal, secure or jam-resistant modes via line-of-sight (LOS) or satellite communications (SATCOM) links.

In one embodiment of the invention, the beamforming processor and modulator allows all radios to use all antenna elements, controls the gain of the antenna array to improve communications, and expands the antenna type options to include conformal arrays including stationary and radome mounted arrays. It also provides a beam steering function to control the directional gain of the array. Baseband beamforming is used to create an independent beam for each radio. This architecture decouples the number of radios from the number of antennas and has the potential for Multiple Input Multiple Output (MIMO) communications.

Figure 3:
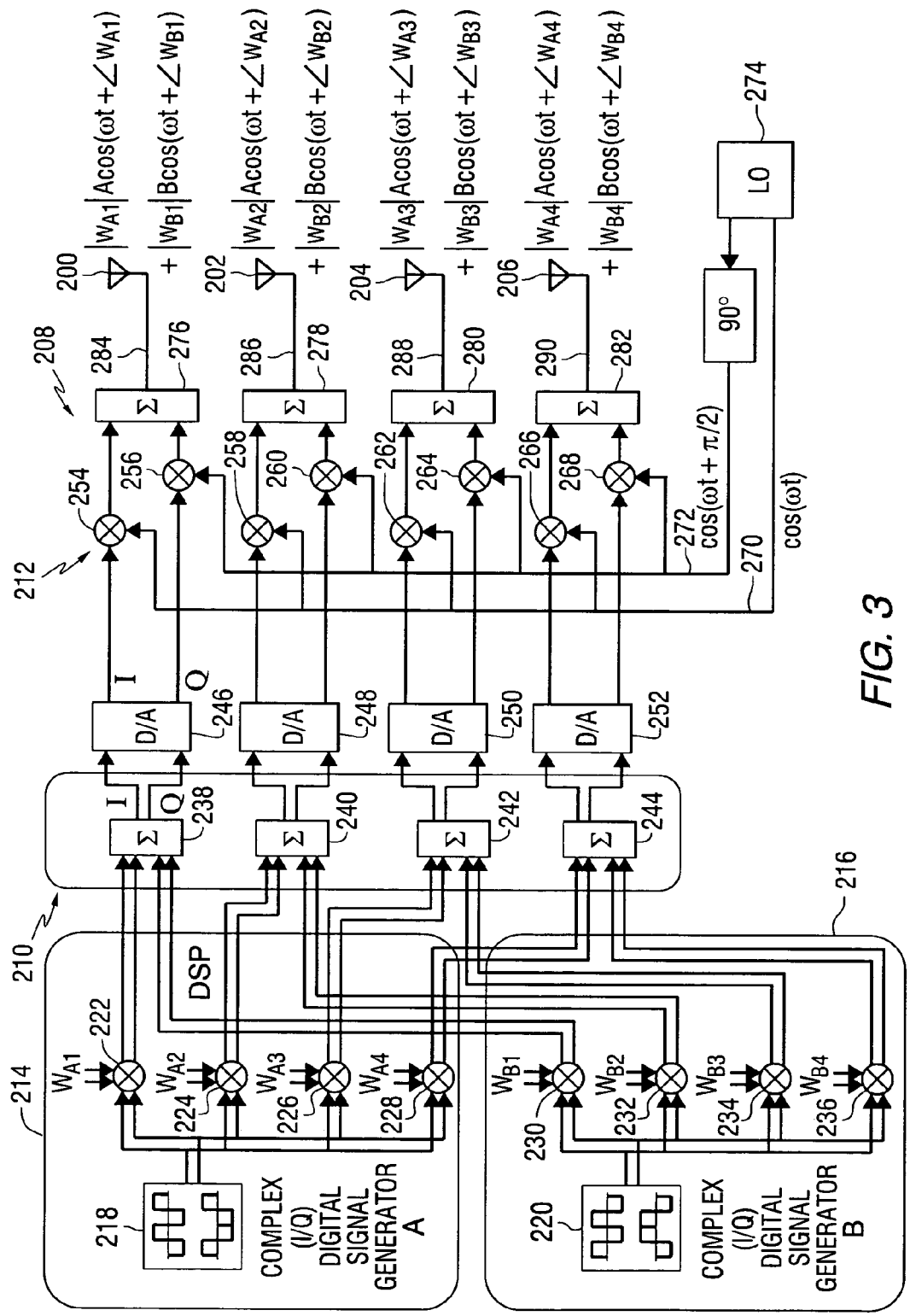
FIG. 3 is a schematic diagram of another apparatus constructed in accordance with the invention.

FIG. 3 is a more detailed schematic diagram of an apparatus constructed in accordance with the invention. The apparatus includes a plurality of antenna elements 200, 202, 204, and 206 for transmitting a plurality of radio frequency signals, each of the radio frequency signals having an associated magnitude and phase. Each of the antenna elements is coupled to a converter and modulator 208, that includes a digital combiner and converter 210, and an in-phase and quadrature (I/Q) radio frequency (RF) modulator 212. A plurality of baseband radio devices 214 and 216 are also coupled to an analog converter and modulator 208. Although only two radio devices are depicted here, the invention applies to any number of radio devices.

The radio devices include complex digital signal generators 218 and 220. The complex digital signal generator 218 produces in-phase and quadrature signals that are combined with weighting factors in mixers 222, 224, 226, and 228. The complex digital signal generator 220 produces in-phase and quadrature signals that are combined with weighting factors in complex digital mixers 230, 232, 234, and 236. The weighted outputs are combined in summation circuits 238, 240, 242 and 244 in the digital combiner 210 to produce composite digital in-phase and quadrature signals that are converted to analog signals by digital-to-analog converters 246, 248, 250 and 252.

The I/Q RF modulator 212 includes a plurality of analog mixers 254, 256, 258, 260, 262, 264, 266 and 268 that receive baseband analog signals from the digital-to-analog converters and mix those signals with a pair of phase displaced signals on lines 270 and 272 from a local oscillator 274. The outputs of the mixers are combined in combiners 276, 278, 280 and 282, to produce RF output signals on lines 284, 286, 288 and 290.

The system of FIG. 3 applies independent digital array weighting at baseband for each radio function, so that when the composite RF signals reach the antenna elements, separate array responses will be realized for each radio function independently through the single antenna array.

Figure 4:
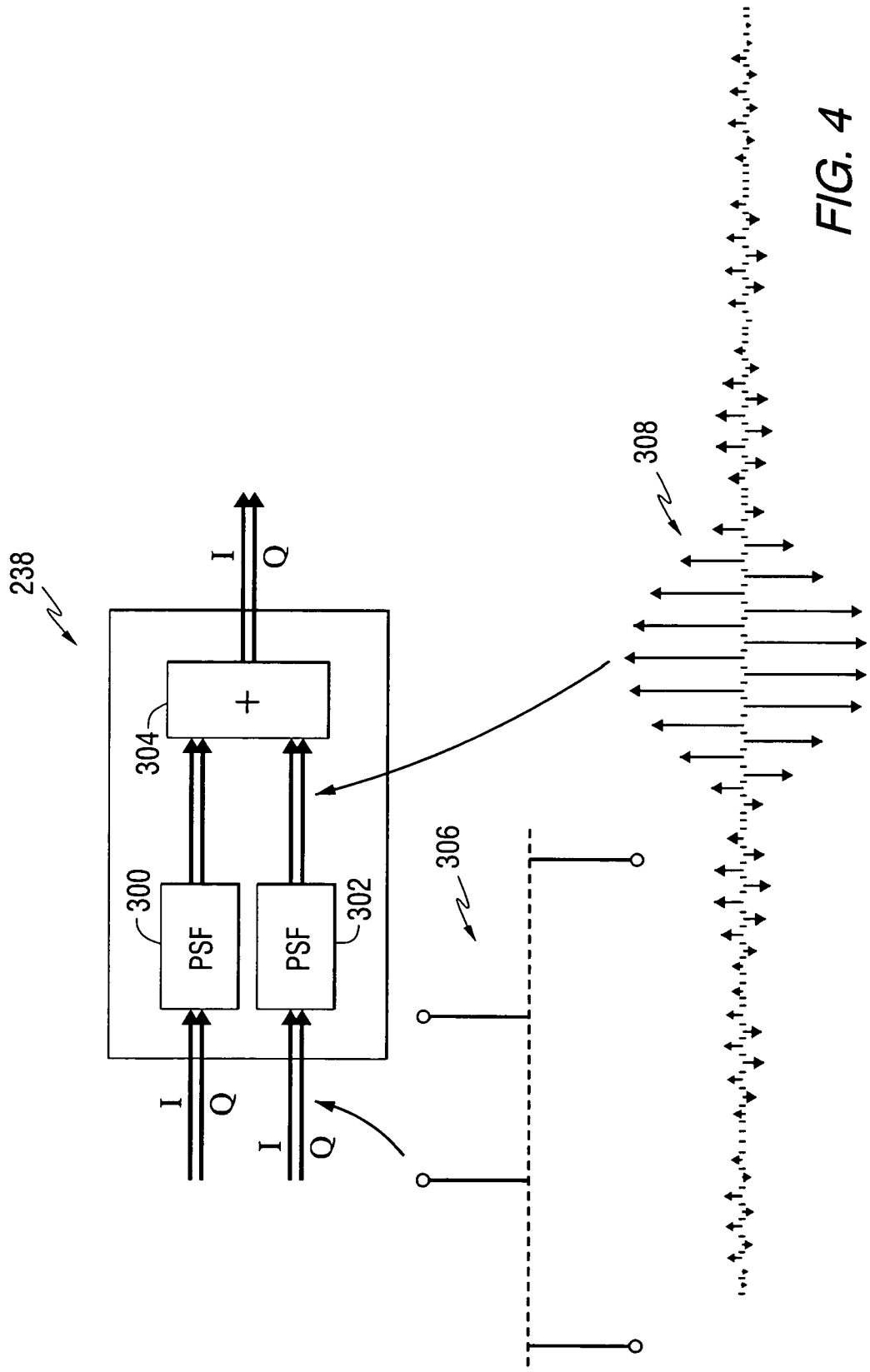
FIG. 4 is a schematic diagram of a summation circuit.

FIG. 4 shows a detail of the summation circuit 238. It includes multiple pulse shaping filters (PSF) 300 and 302, one for each radio device 214 and 216, followed by a single adder 304. Each PSF and the adder perform simultaneous dual operations—one on the I data stream and one on the Q data stream. For simplicity of explanation, waveform 306 illustrates the bits of a data stream. FIG. 4 depicts the effect of the summation circuit on the Q data stream only, however the same effect is applied to the I data stream. Each PSF converts each data bit into a sequence of signal samples 308. The samples in the sequence have amplitudes that fit underneath an envelope of a pulse shape that is desirable for digital transmission, such as a Nyquist pulse, the width of which is optimized for the data rate. The sample interval of the sequence is short enough to represent the highest intermediate frequency (IF) associated with the radio devices 214 and 216, as dictated by state-of-the-art sampling theory. The use of digital IF conversion built into the pulse shaping function enables the multiple radio devices to operate at independent radio frequencies. The IF of radio devices 214 and 216 will generally be different. When modulated by the single common RF local oscillator 274, these independent IFs will result in independent RF signals for radio devices 214 and 216.

As shown in FIG. 4, the sampled signals coming out of each of the PSFs, each having an independent IF modulation, are combined into a composite sampled signal in the adder. This composite sampled signal will contain the data from each radio function associated with the same antenna element, will have the pulse shaping desired for digital transmission, and will include independent IF modulation for each radio function that is dependant on the independent RF carrier desired for each radio function.

Figure 5:
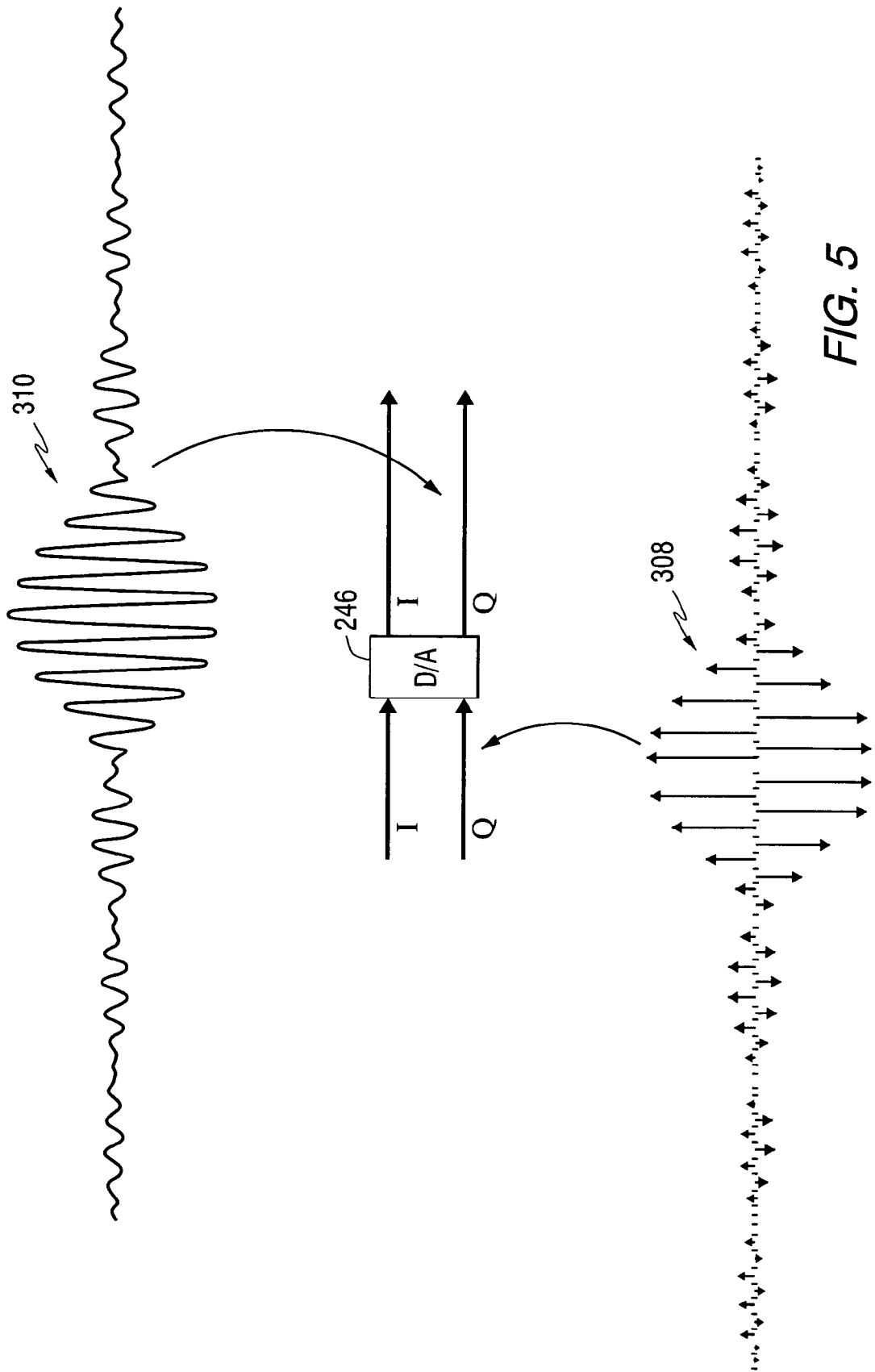
FIG. 5 is a schematic diagram that shows the effect of the digital-to-analog (D/A) converter.

FIG. 5 shows the effect of the digital-to-analog (D/A) converter 246. For simplicity of explanation, the input 308 to D/A 246 shown contains only the contribution from one of the two radio devices 214 and 216. For further simplicity of explanation, the illustration depicts the effect on the Q sampled signal only. The samples of the Nyquist pulse 308 modulated by the desired IF carrier are converted into an equivalent analog signal 310 by the D/A converter, providing an analog Nyquist pulse modulated by the desired IF carrier. In actuality, the input sampled signal will include a composite of Nyquist pulse representation of the data from both radio devices 214 and 216, and the output of the D/A converter would be the analog equivalent of this composite sampled signal coming out of adder 238. When this analog composite signal is modulated by the single RF local oscillator 274, a composite RF signal will result. The components of the composite RF signal associated with each of the radio devices 214 and 216 will appear at their own independent RFs.

The additional effect that this digital IF modulation has on the transmit function depicted in FIG. 3 is that by performing separate IF modulation digitally and independently for each radio function, the composite RF signal reaching the antenna elements will include one RF component that is the result of the combination of the IF modulation associated with one radio function with the single common RF up conversion, and a separate and independent RF component that is the result of the combination of the IF modulation associated with the other radio function with the single common RF up conversion.

The complete net effect of digital baseband beamforming and digital IF modulation is that the composite RF signal at the antenna elements will form two independent array responses, one that carries the data associated with one radio function and one that carries the data associated with the other radio function, even though there is only one common array, and each of these independent array responses will be transmitted at separate and independent RFs, one RF associated with one radio function and the other RF associated with the other radio function, even though there is only a single local oscillator for RF up conversion.

Figure 6:
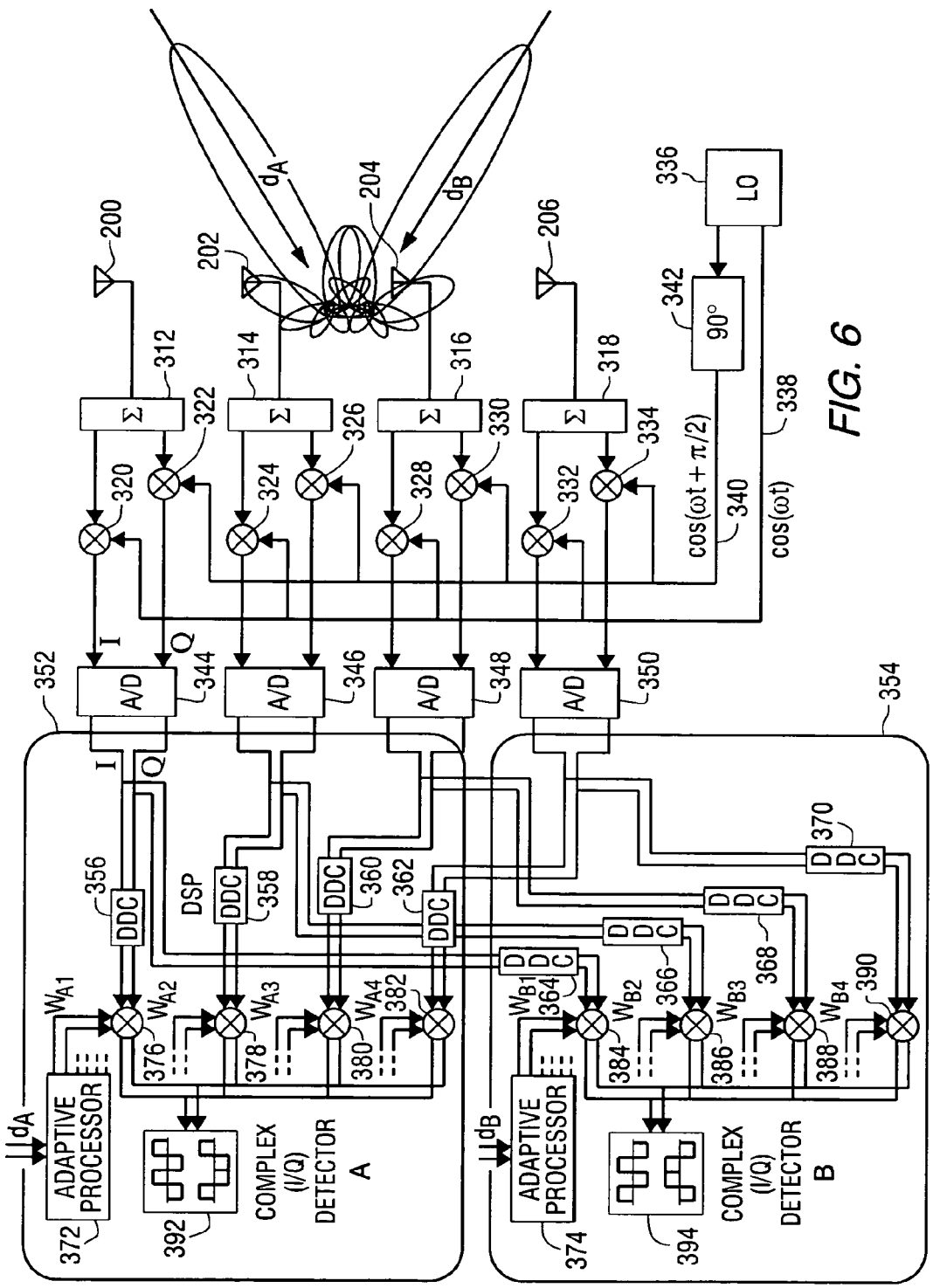
FIG. 6 is a schematic diagram that depicts the receive function.

FIG. 6 is a schematic diagram of an embodiment of the invention that depicts the receive function. The antenna elements 200, 202, 204 and 206 are connected to splitters 312, 314, 316 and 318. The outputs of the splitters are mixed in mixers 320, 322, 324, 326, 328, 330, 332 and 334 with signals from a local oscillator 336 on lines 338 and 340. The signal on line 340 is offset by 900 by a phase shifter 342. This produces in-phase and quadrature components of the received signals. These in-phase and quadrature components are converted to digital signals by analog-to-digital converters 344, 346, 348 and 350, and passed to receivers 352 and 354. A plurality of digital down converters 356, 358, 360, 362, 364, 366, 368 and 370 convert the digital signals to baseband. The digital baseband signals are then weighted by being mixed with weighting factors produced by adaptive processors 372 and 374. The outputs of the complex digital mixers 376, 378, 380, 382, 384, 386, 388 and 390 are then detected by complex detectors 392 and 394.

In FIG. 6, RF signal energy is received by each of the antenna elements, and then down converted using a single RF local oscillator. If the received RF energy includes two signals at different RFs, the composite signal after down conversion will include components at two separate IFs, one associated with each of the two radio receiver devices shown. (Although two radio receiver devices are used in this description, those versed in the art will recognize that the concept is easily expanded to any number of radio receiver devices.) The I and Q IF analog signals associated with the signal received by each antenna element are then digitized by each of the A/D converters, creating a set of composite digital IF signals associated with the signal received by each antenna element. Once digitized, two replicas of each complex digital signal are created, one for each of the radio devices.

Digital down conversion (DDC) will then be applied to all digital paths. The DDCs feeding digital radio receiver 352 will modulate the composite digital signal so that the component intended for digital radio receiver 352 of the composite signal will be converted to baseband. The DDCs feeding digital radio receiver 354 will modulate the composite digital signal so that the component intended for digital radio receiver 354 of the composite signal will be converted to baseband.

Figure 7:
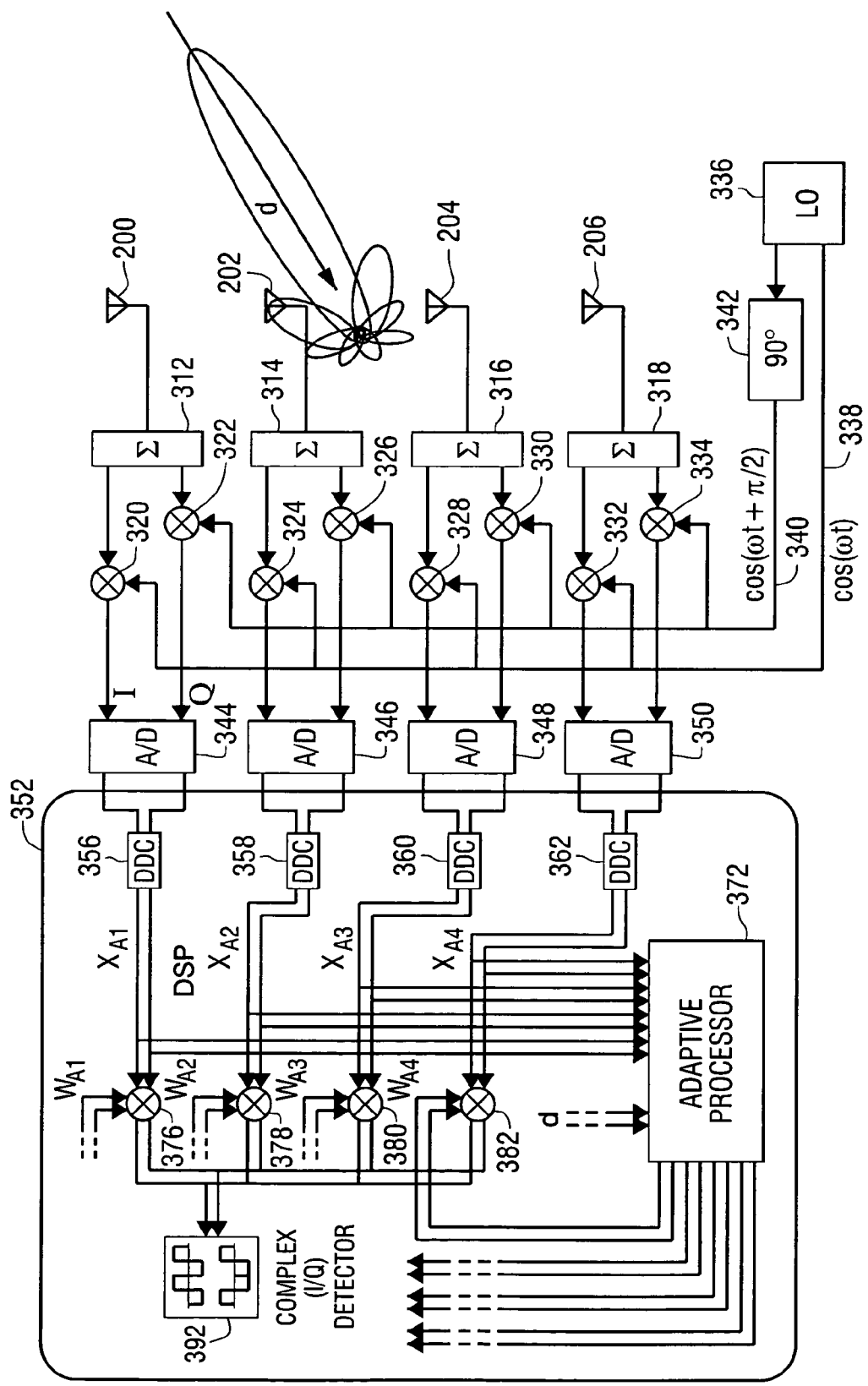
FIG. 7 is another schematic diagram that depicts the receive function.

After the digital down conversions are performed, there are four digital baseband signals for each radio receiver. Each of the four signals represents a digital baseband version of the signal received at the corresponding antenna element. A weighted combination of each receiver's four baseband signals is created using an independent weight set for each radio device. The weight set used for digital radio receiver 352 creates an effective antenna array response pattern with a beam steered in the direction of the signal transmission intended for that digital radio receiver 352. The weight set used for radio receiver 354 creates an effective antenna array response pattern with a beam steered in the direction of the signal transmission intended for that digital radio receiver 354 that is independent of the array response pattern created for digital radio receiver 354. The weight set associated with digital radio receiver 352 is obtained by using an adaptive beam steering algorithm that seeks to minimize the mean square error between the received weighted summed baseband signal and the locally generated baseband representation of the actual signal transmitted to digital radio receiver 352. The optimal Minimum Mean Square Error (MMSE) weights are given by:

$$\overline{W} = [E\{\overline{xx}^*\}]^{-1} E\{d^*\overline{x}\} = R_{xx}^{-1} s$$

where the vector $\overline{x}$ is the set of four digital baseband signals that are being combined, and d is the actual transmitted signal. This is detailed in FIG. 7. The weight set associated with digital radio receiver 354 would be obtained by using a similar adaptive beam steering algorithm, however in this instance the algorithm seeks to minimize the mean square error between the received weighted summed baseband signal and the locally generated baseband representation of the actual signal transmitted to digital radio receiver 354.

Since most of the radio links are (and will be) digital, the adaptive algorithm used to determine the weight set for each radio function could use training bits embedded in the messages of each corresponding radio link as the reference signal d. Alternatively, some form of decision-directed feedback operating on the digital symbols in each link could be used, in which a hard decision on each symbol value is assumed to be correct and is then used as a reference signal. The use of software-defined-radio technology would facilitate the implementation of these approaches.

This antenna array concept could be expanded to include automatic channel estimation to remove multipath distortion using so-called "space-time adaptive processing." The concept could further be expanded to support Multiple Input Multiple Output (MIMO) links, in which forward error correction coding is distributed over not only time, but also over the antenna elements, providing advantages of both temporal and spatial diversity. MIMO has been shown to be very effective in improving the quality of wireless links used in packet-switched networks, such as the high-speed IP data networks that are anticipated for the future airborne military user.

Figure 8:
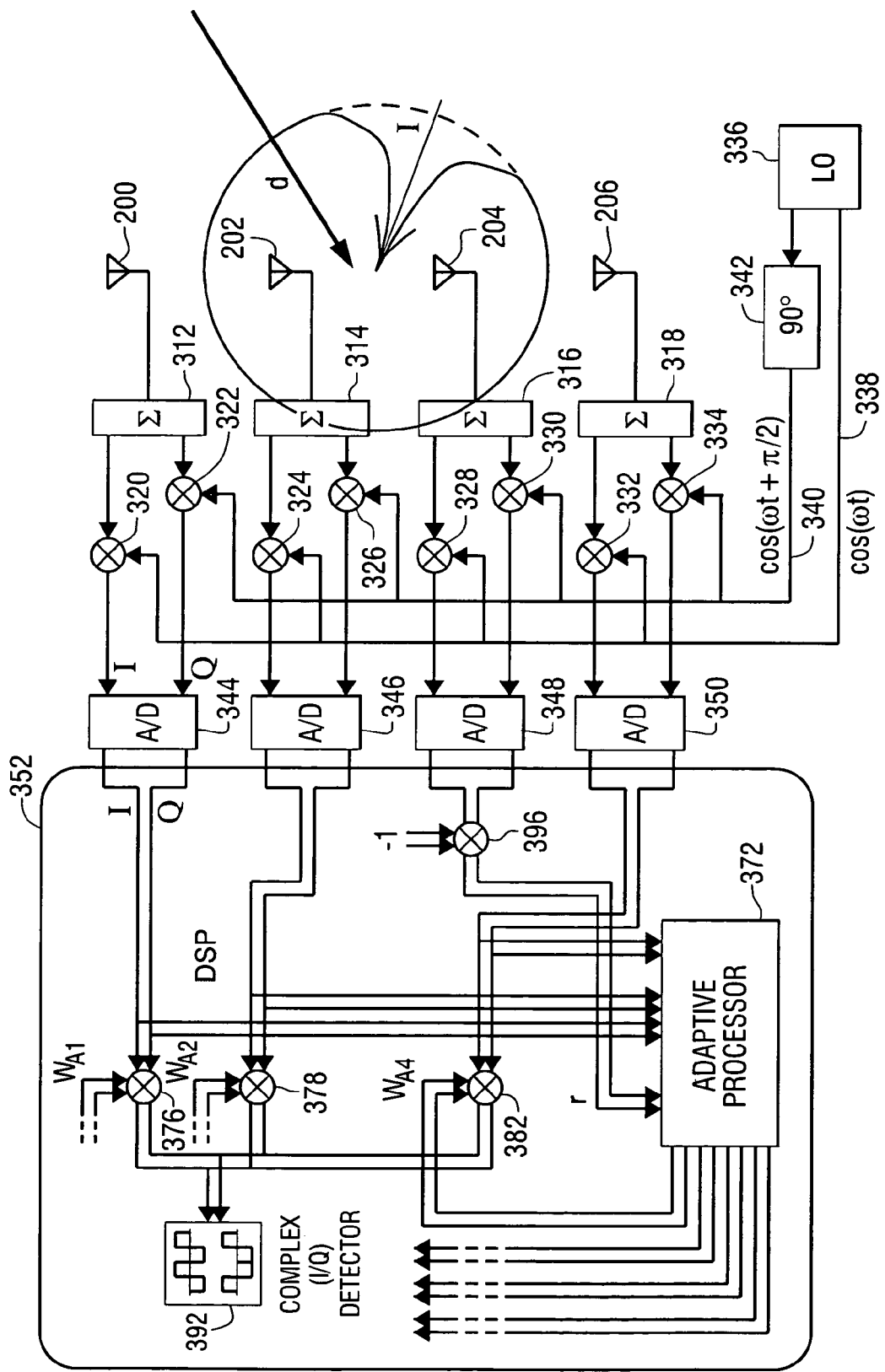
FIG. 8 is yet another schematic diagram that depicts the receive function.

The architecture developed for this invention could be easily changed, without any hardware switches or controls, using the same antenna array, to a configuration that would require neither a pilot nor a training signal, but would instead work to minimize total power with the constraint that one of the antenna elements would always have unity gain. The adaptive algorithm would then automatically place spatial nulls in the direction of strong jammers. This configuration is shown in FIG. 8, wherein mixer 396 combines the received signal with a unity weighting factor. Depending on the mode of operation, the system could easily switch between the first configuration, which utilizes training or pilot information from the desired signal to steer spatial beams in the desired signal direction and place nulls in interferer directions, and the second architecture, which requires no cooperation from the desired signal, but automatically places nulls in the direction of jammers. The second configuration would be useful in an acquisition mode, prior to obtaining a track on the desired signal.

In the alternative configuration, when no desired signal training or pilot is available to drive an adaptive algorithm, minimizing the total output power (subject to some constraint that keeps the array from collapsing to zero) is a criterion. It is assumed that jammers are very strong compared to desired signals. If, however, there is a desired signal whose strength is comparable to an interferer, this desired signal could inadvertently be attenuated in this configuration. In such a situation, one could consider a super-resolution approach, which can blindly separate all signals of significant strength (i.e., blind source separation). Another approach might use a super-resolution-style singular-value decomposition to create a subspace of strong signals that can be separated and detected. The desired signals in this subspace could then be removed from the original signal space, creating a complimentary subspace of all the weak desired signals and the strong jammers. An MMSE-driven power-minimization adaptation could then be performed on the complimentary subspace to null the jammer signals.

Figure 9:
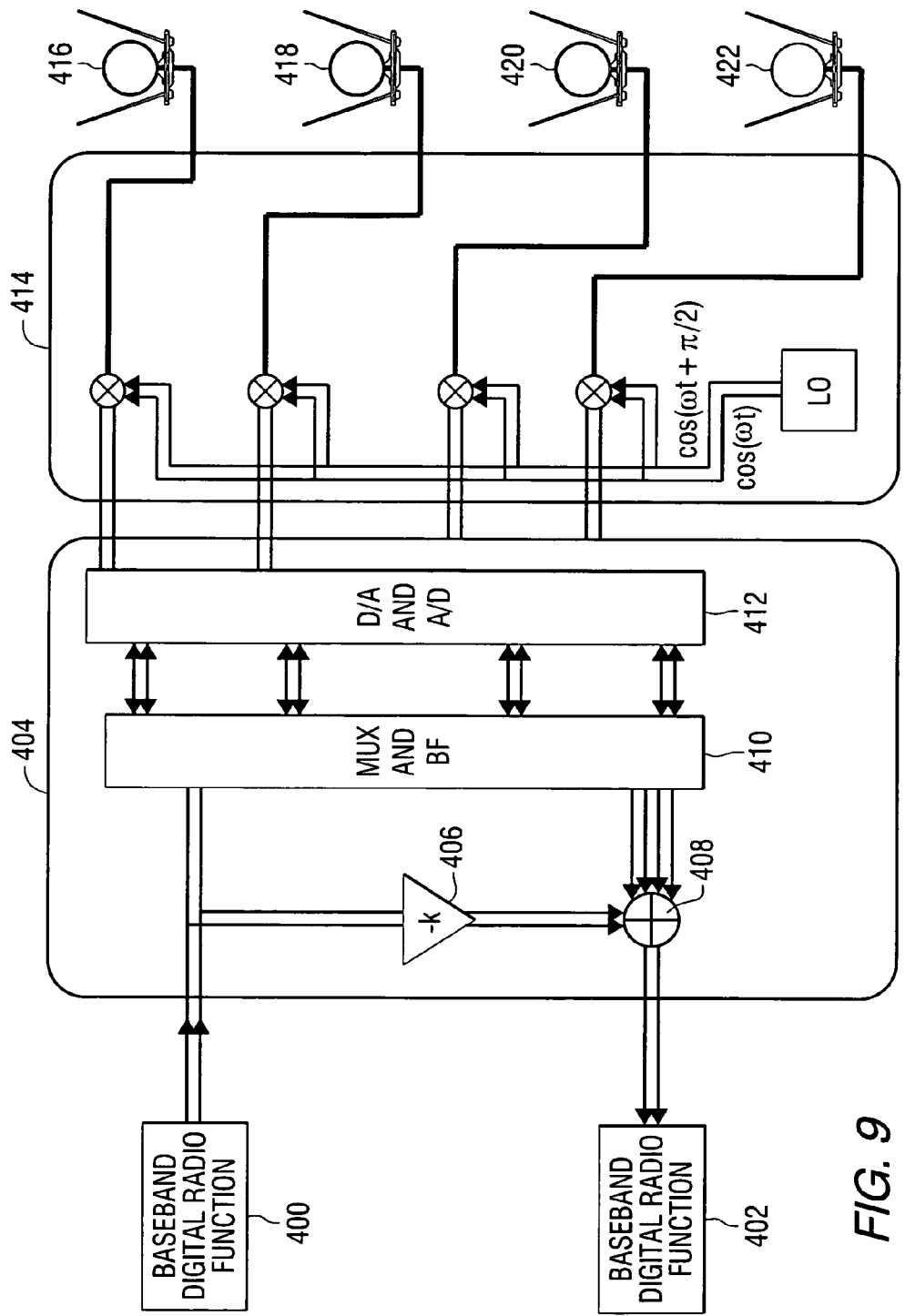
FIG. 9 is a schematic diagram that depicts active adaptive cancellation of cross-talk interference between communication links.

An added benefit of the architecture, which would enable baseband beamforming, is the ability, with no additional hardware, to implement active adaptive cancellation of crosstalk interference between communication links operating simultaneously, as illustrated in FIG. 9. In the system of FIG. 9, radio devices 400 and 402 are connected to a beamforming processor 404. The beamforming processor 404 includes an amplifier 406, a summer 408, a multiplexing and beamforming circuit 410 and a plurality of digital-to-analog and analog-to-digital converters 412. A modulator/demodulator 414 is connected between the beamforming circuit 410 and a plurality of antennas 416, 418, 420 and 422.

Figure 10:
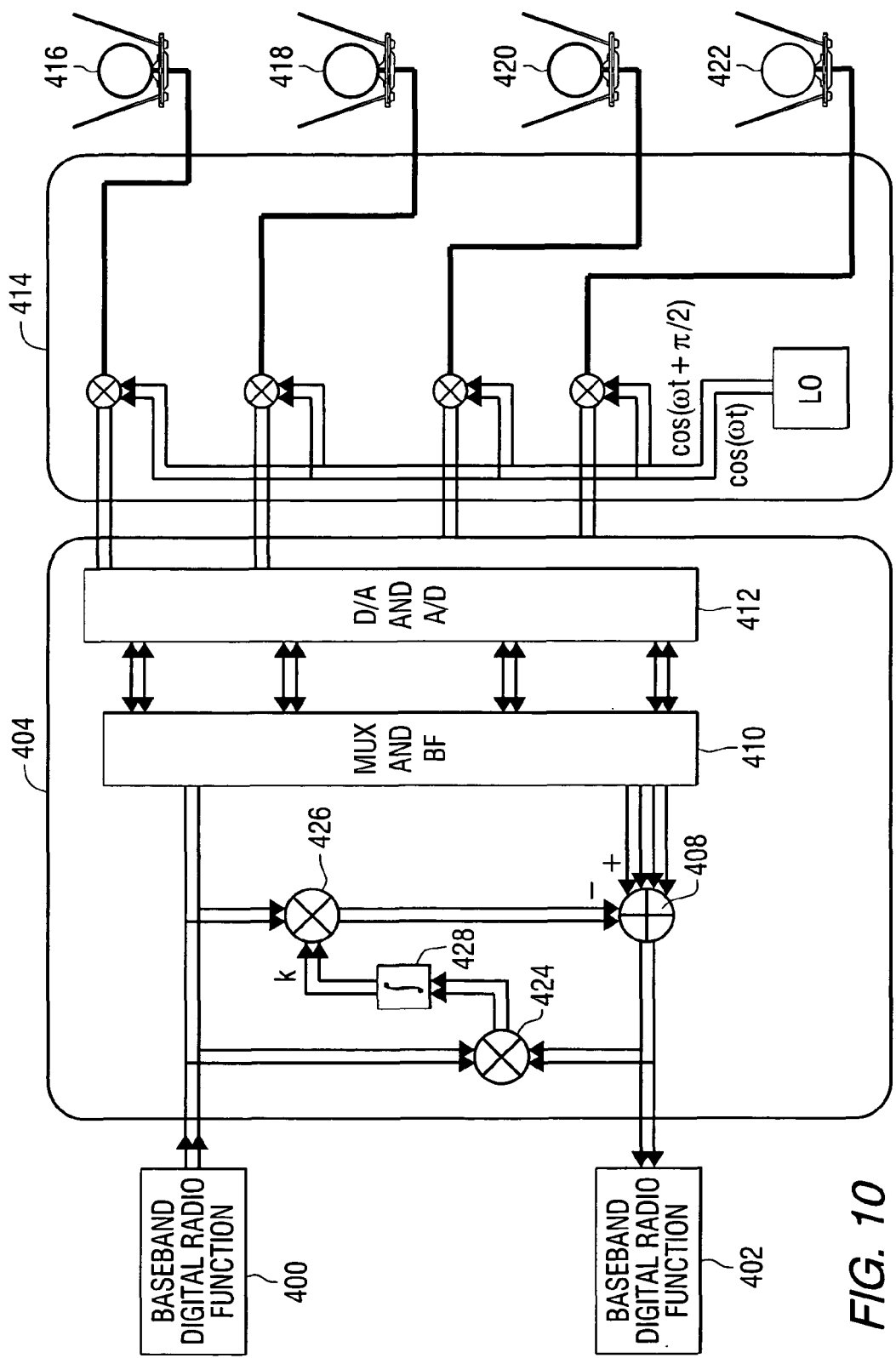
FIG. 10 is a schematic diagram that depicts optimal gain on a canceling signal.

The optimal gain k on the canceling signal can be obtained adaptively as illustrated in FIG. 10. The system of FIG. 10 is similar to that of FIG. 9, except that the amplifier has been replaced by first and second mixers 424 and 426, and an integrator 428.

The adaptation process for active cancellation can be integrated into the adaptation process for beamforming. Further, a single adaptive cancellation loop can be generalized to an adaptive finite impulse response (FIR) filter to compensate for non-linear distortion that the interfering signal would experience during transmission from a transmit antenna to a receive antenna.

Figure 11:
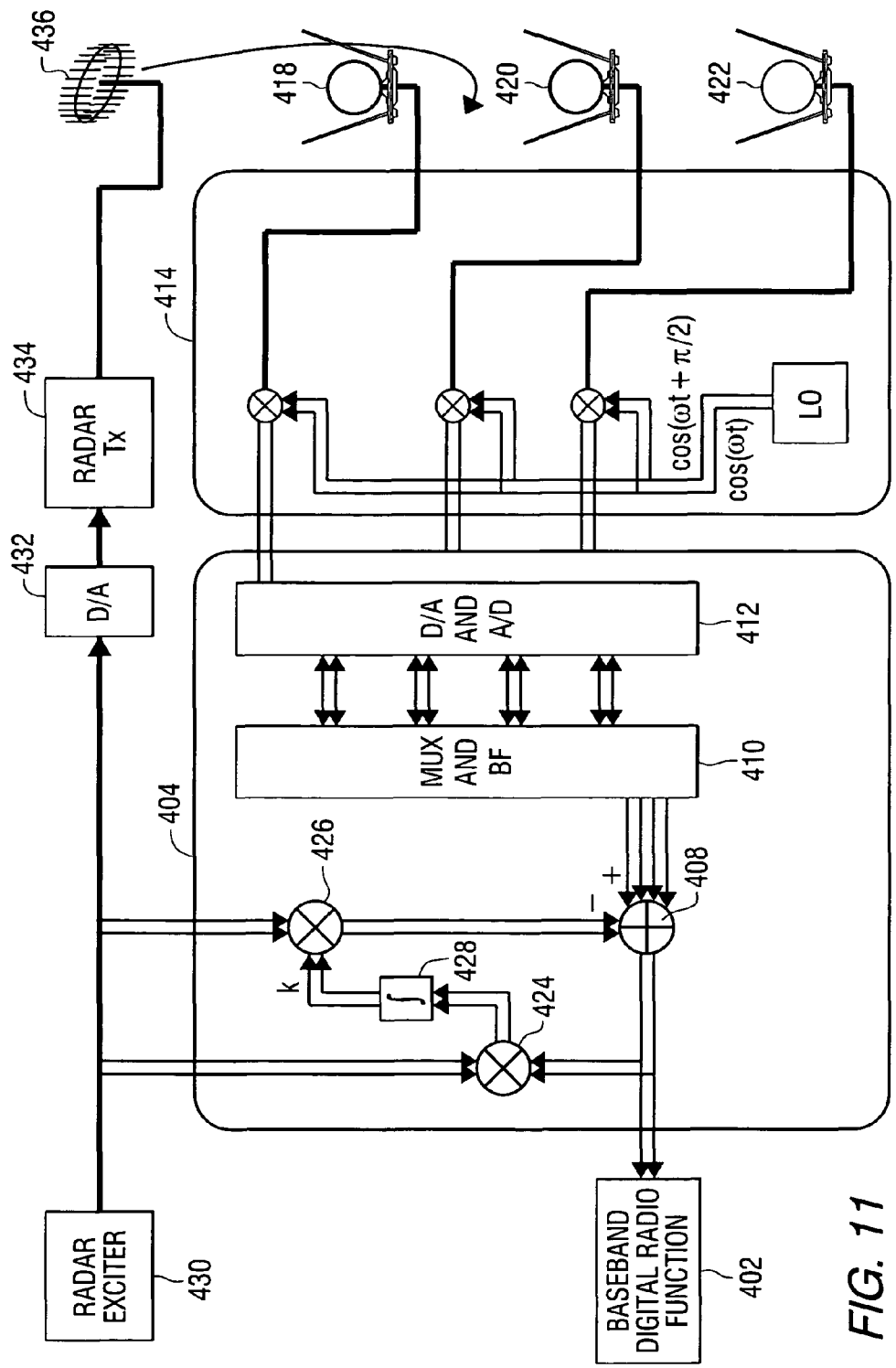
FIG. 11 is a schematic diagram that depicts adaptive cancellation of interfering signal from an on-board radar transmitter.
Figure 12:
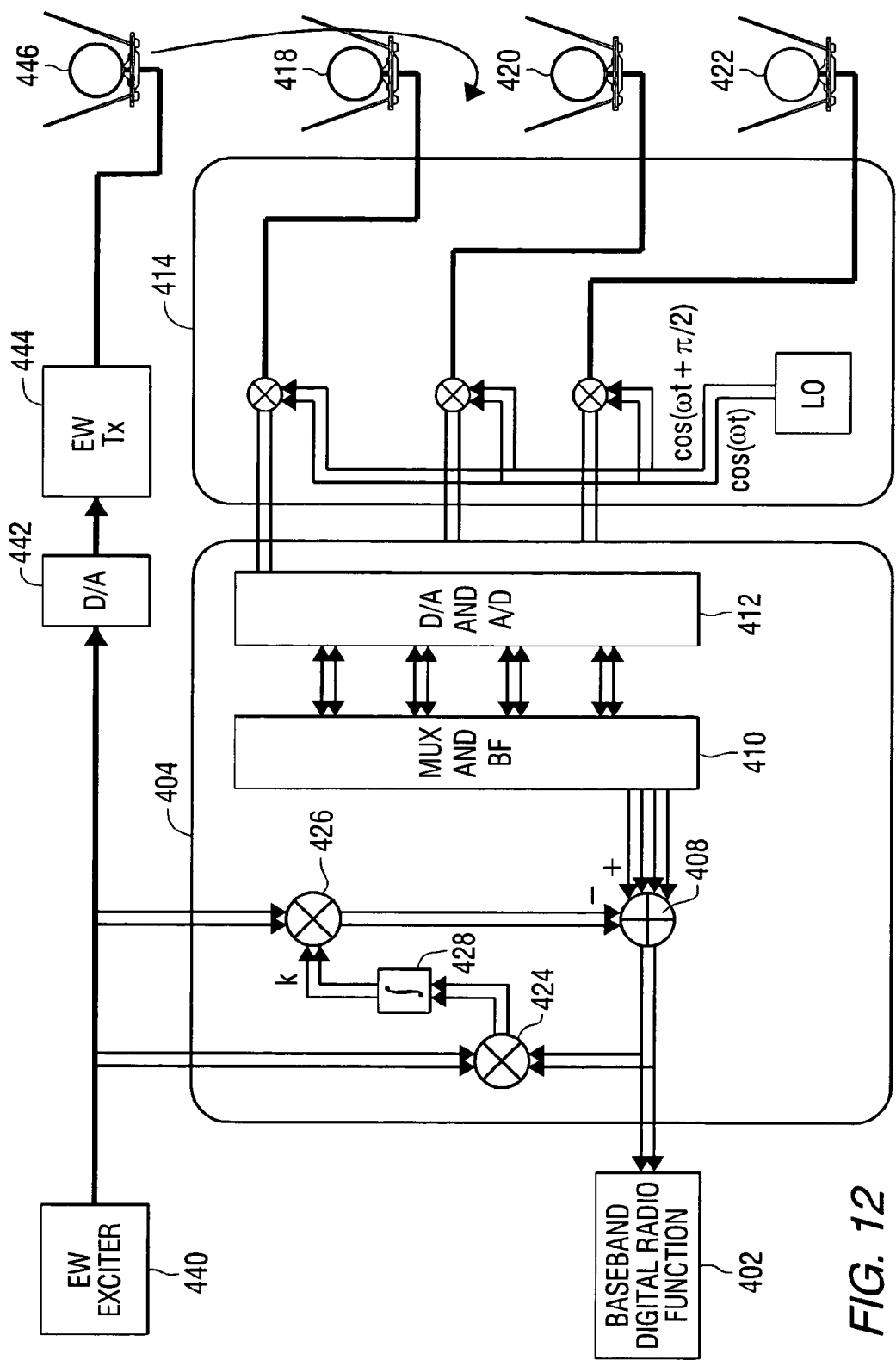
FIG. 12 is another schematic diagram that depicts adaptive cancellation of an interfering signal from an on-board electronic warfare (EW) jammer transmitter.

Similar adaptive cancellation can be applied to interfering signals from on-board jammers and radars, as shown in FIGS. 11 and 12, respectively. The system of FIG. 11 is similar to that of FIG. 10, except that one of the radio devices is now a radar exciter 430, which is connected to a separate digital-to-analog converter 432, a radar transmitter 434 and an antenna 436.

The system of FIG. 12 is similar to that of FIG. 10, except that one of the radio devices is now an electronic warfare (EW) exciter 440, which is connected to a separate digital-to-analog converter 442, an EW transmitter 444 and an antenna 446.

Systems constructed in accordance with this invention use added processing to provide improved performance. If processing gains are sufficient to allow transmit power and antenna element size to be reduced, a net savings in weight and power could be realized.

While the invention has been described in terms of several embodiments, it will be apparent to those skilled in the art that various changes can be made to the described embodiments without departing from the scope of the invention as set forth in the following claims.

What is claimed is:

1. An apparatus comprising:
a single array of a plurality of antenna elements;
a plurality of radio devices, each including a complex digital signal generator for supplying in-phase and quadrature digital baseband signals to be transmitted from the array of antenna elements and a beamforming processor for weighting the in-phase and quadrature digital baseband signals to be transmitted by each of the antenna elements to adaptively form an independent beam pattern for each of the radio devices at the antenna elements;
a combiner for adding the weighted in-phase and quadrature digital baseband signals from each of the radio devices to produce a plurality of composite digital signals to be transmitted by each of the antenna elements, wherein the combiner comprises a plurality of summing elements for summing the weighted in-phase and quadrature digital baseband signals, and wherein each of the summing elements comprises a plurality of pulse shaping filters and an adder;
a plurality of digital to analog converters converting the composite digital signals to composite analog signals; and
a modulator for modulating the composite analog signals to produce radio frequency output signals for the array of antenna elements.

2. The apparatus of claim 1, wherein the radio devices apply independent digital array weighting at baseband.

3. A method comprising the steps of:
using a plurality of radio devices each including a complex digital signal generator to produce a plurality of in-phase and quadrature digital baseband signals to be transmitted from a single array of a plurality of antenna elements and a beamforming processor to weight the in-phase and quadrature digital baseband signals to adaptively form an independent beam pattern for each of the digital signal processing devices at the array of antenna elements;
adding the weighted in-phase and quadrature digital baseband signals from each of the radio devices using a plurality of summing elements for summing the weighted in-phase and quadrature digital baseband signals, wherein each of the summing elements comprises a plurality of pulse shaping filters and an adder, to produce a plurality of composite digital signals to be transmitted by each of the antenna elements;
converting the composite digital signals to composite analog signals; and
modulating the composite analog signals to produce radio frequency output signals for the array of antenna elements.

4. The method of claim 3,
wherein the radio devices apply independent digital array weighting at baseband.

* * * * *

UNITED STATES PATENT AND TRADEMARK OFFICE
CERTIFICATE OF CORRECTION

PATENT NO. : 7,830,982 B2  Page 1 of 1
APPLICATION NO. : 11/433695
DATED : November 9, 2010
INVENTOR(S) : David Keith Mesecher It is certified that error appears in the above-identified patent and that said Letters Patent is hereby corrected as shown below:

Column 5, Line 15
"900" should read "90°"

Signed and Sealed this
Thirteenth Day of December, 2011

David J. Kappos
*Director of the United States Patent and Trademark Office*